(12) United States Patent
Kirchhoff et al.

(10) Patent No.: US 11,041,489 B2
(45) Date of Patent: Jun. 22, 2021

(54) COMPRESSOR ASSEMBLY FOR OPERATING A COMPRESSED AIR SUPPLY SYSTEM, COMPRESSED AIR SUPPLY SYSTEM, AND VEHICLE

(71) Applicant: WABCO GmbH, Hannover (DE)

(72) Inventors: Dirk Kirchhoff, Leine (DE); Frank Meissner, Hannover (DE); Eduard Nuss, Gronau (DE); Marco Seeger, Langenhagen (DE)

(73) Assignee: ZF CV SYSTEMS HANNOVER GMBH, Hannover (DE)

( * ) Notice: Subject to any disclaimer, the term of this patent is extended or adjusted under 35 U.S.C. 154(b) by 0 days.

(21) Appl. No.: 16/757,773

(22) PCT Filed: Sep. 5, 2018

(86) PCT No.: PCT/EP2018/073809
§ 371 (c)(1),
(2) Date: Apr. 21, 2020

(87) PCT Pub. No.: WO2019/081106
PCT Pub. Date: May 2, 2019

(65) Prior Publication Data
US 2020/0378377 A1    Dec. 3, 2020

(30) Foreign Application Priority Data
Oct. 23, 2017  (DE) .................... 10 2017 009 842.5

(51) Int. Cl.
*H02K 5/04*     (2006.01)
*H02K 7/08*     (2006.01)
(Continued)

(52) U.S. Cl.
CPC .............. *F04B 35/04* (2013.01); *F04B 39/16* (2013.01); *H02K 5/04* (2013.01); *H02K 7/02* (2013.01); *H02K 7/08* (2013.01); *H02K 7/14* (2013.01)

(58) Field of Classification Search
CPC ........... H02K 5/04; H02K 7/08; H02K 7/086; H02K 7/088; H02K 7/14; H02K 7/02
(Continued)

(56) References Cited

U.S. PATENT DOCUMENTS 4,259,603 A    3/1981  Uchiyama
4,417,167 A    11/1983 Ishii
(Continued)

FOREIGN PATENT DOCUMENTS

CN    103944311 A    7/2014
DE    102013100015 A1    7/2014
(Continued)

*Primary Examiner* — John K Kim
(74) *Attorney, Agent, or Firm* — Leydig, Voit & Mayer, Ltd.

(57) ABSTRACT

A compressor arrangement for operating a compressed air supply installation includes a pneumatic compressor and an electric motor arranged inside a drive housing, the electric motor having an internal stator and an external outer rotor. The external outer rotor is arranged in a rotatable manner about the internal stator. The external outer rotor is supported in a rotatable manner about a center axis with respect to the drive housing via a bearing arrangement. The bearing arrangement has at least one bearing. The external outer rotor is supported by the bearing arrangement on an outer circumference of the outer rotor.

20 Claims, 6 Drawing Sheets

(51) Int. Cl.
  *H02K 7/14* (2006.01)
  *H02K 7/02* (2006.01)
  *F04B 35/04* (2006.01)
  *F04B 39/16* (2006.01)
(58) Field of Classification Search
  USPC .......................................................... 310/90
  See application file for complete search history.

(56) References Cited

U.S. PATENT DOCUMENTS

| | | | |
|---|---|---|---|
| 5,394,283 A | 2/1995 | Hans | |
| 5,900,722 A * | 5/1999 | Scott | B23K 9/1062 |
| | | | 290/49 |
| 2006/0290223 A1 | 12/2006 | Burri | |
| 2010/0221128 A1 | 9/2010 | Mellar | |
| 2011/0308241 A1* | 12/2011 | Huff | B60K 6/12 |
| | | | 60/327 |
| 2012/0262021 A1* | 10/2012 | Lafontaine | H02K 7/088 |
| | | | 310/156.08 |
| 2016/0001624 A1* | 1/2016 | Meissner | F04B 17/03 |
| | | | 417/53 |
| 2020/0378377 A1* | 12/2020 | Kirchhoff | F04B 39/128 |

FOREIGN PATENT DOCUMENTS

| | | |
|---|---|---|
| DE | 102013003513 A1 | 9/2014 |
| JP | H 0378163 A | 4/1991 |
| WO | WO 2009033556 A1 | 3/2009 |

* cited by examiner

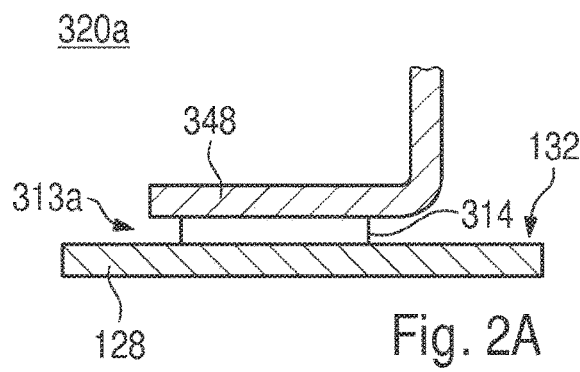
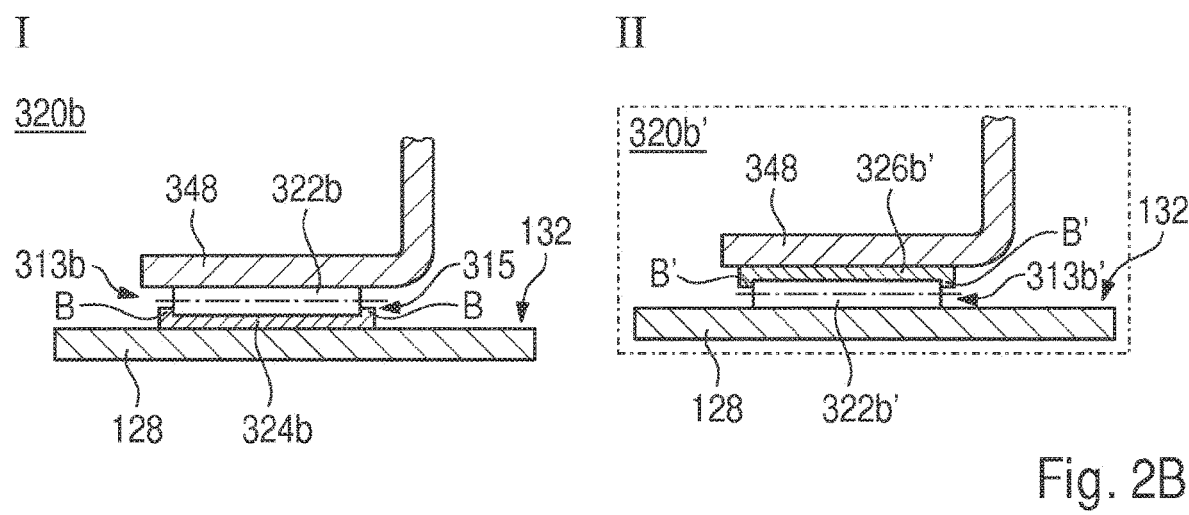

COMPRESSOR ASSEMBLY FOR OPERATING A COMPRESSED AIR SUPPLY SYSTEM, COMPRESSED AIR SUPPLY SYSTEM, AND VEHICLE

CROSS REFERENCE TO RELATED APPLICATIONS

This application is a U.S. National Phase Application under 35 U.S.C. § 371 of International Application No. PCT/EP2018/073809, filed on Sep. 5, 2018, and claims benefit to German Patent Application No. DE 10 2017 009 842.5, filed on Oct. 23, 2017. The International Application was published in German on May 2, 2019 as WO 2019/081106 under PCT Article 21(2).

FIELD

The invention relates to a compressor arrangement including an external rotor electric motor arranged inside a drive housing and further including a pneumatic compressor.

BACKGROUND

Such a compressor arrangement for operating a compressed air supply installation has: an electric motor which is arranged inside a drive housing and which has an internal stator and an external outer rotor, wherein the outer rotor is arranged in a rotatable manner about the internal stator, and a pneumatic compressor. Air supply installations, in particular compressed air supply installations, for pneumatic suspensions, level adjustment systems or other applications are generally known. Such air supply installations produce compressed air in order to supply compressed air consumers therewith, such as the pneumatic suspension mentioned by way of example. The compressed air is produced by means of a compressor which is driven in particular via an electric motor.

WO 2009/033556 A1 discloses a compact dry-running piston compressor having at least one cylinder for compressing air by means of an associated piston which can be moved by electric motor by a crank mechanism which comprises a crankshaft and connecting rod and which is rotatably supported in an oil-bath-free compressor housing via permanently lubricated roller bearings and which produces a housing-internal cooling air flow as a result of the movement cycle, wherein the compressor housing comprises two housing halves which are separated via a partition wall in order to receive the crank mechanism within the first housing half and to receive the electric motor within the second housing half, wherein a roller bearing which is common to the crank mechanism and the electric motor and which is located in the cooling air flow which passes the first housing half is inserted in the partition wall.

DE 10 2013 003 513 A1 discloses a compressor arrangement which is mentioned in the introduction for operating a compressed air supply installation of a vehicle, having a compressor with an electric motor which is formed as an electronically commutated, brushless direct-current motor having a control circuit comprising an electronic power unit (BL-DC motor) and a pneumatic compressor. There is further provision for the electric motor to be formed in the form of an external rotor motor.

SUMMARY

In an embodiment, the present invention provides a compressor arrangement for operating a compressed air supply installation. The compressor arrangement includes a pneumatic compressor and an electric motor arranged inside a drive housing, the electric motor having an internal stator and an external outer rotor. The external outer rotor is arranged in a rotatable manner about the internal stator. The external outer rotor is supported in a rotatable manner about a center axis with respect to the drive housing via a bearing arrangement. The bearing arrangement has at least one bearing. The external outer rotor is supported by the bearing arrangement on an outer circumference of the outer rotor.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 2A-F show different embodiments of a rotor bearing;

DETAILED DESCRIPTION

Figure 1:
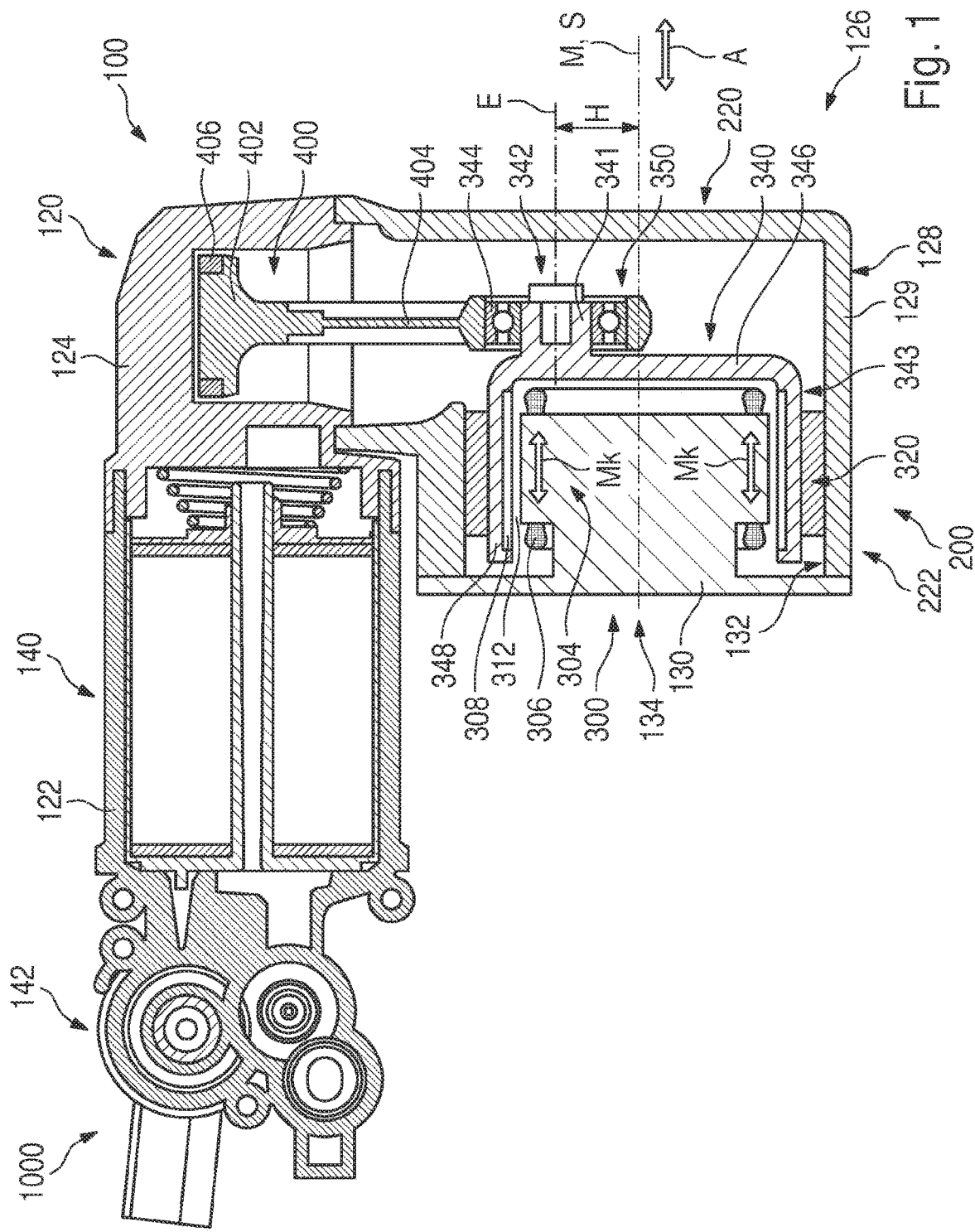
FIG. 1 shows a constructive configuration of a compressed air supply installation.

Approaches utilizing brushless direct-current motors and external rotor motors are in need of further improvement.

It is desirable to improve the function of a compressed air supply installation, with particular regard to compactness, service-life, noise development, assembly and maintenance-friendliness, and efficiency.

The present disclosure describes improved compressed air supply installations which partially or completely achieve such improved function. In particular, the compressed air supply installations reduce the structural space and weight of a compressor arrangement, in particular a drive for a compressor, and improve the operating properties of a compressor.

The present disclosure describes a compressor arrangement for operating a compressed air supply installation having an electric motor which is arranged inside a drive housing and which has an internal stator and an external outer rotor, wherein the outer rotor is arranged in a rotatable manner about the internal stator, and a pneumatic compressor.

On the basis of this compressor arrangement, there is provision for the outer rotor to be supported in a rotatable manner about a center axis with respect to the drive housing via a bearing arrangement which has at least one bearing, and for the outer rotor to be supported, in particular exclusively, by the bearing arrangement on the outer circumference of the outer rotor.

The disclosure takes as a basis the consideration that an external rotor motor acting as a drive motor for a compressor generally leads to advantages. These advantages include in particular the additional property of the outer rotor as a flywheel for storing energy and the moment of inertia which can be achieved in connection with a brushless direct-current motor and the consequently higher dynamic requirements which can be achieved. It is also possible by means of a constructional configuration of the electric motor in the form of an external rotor motor to achieve a considerable reduction of the installation space and consequently the spatial requirements and weight requirements of the entire compressed air supply installation.

The disclosure has recognized that support of the outer rotor, in particular the external rotor, on the outer circumference leads to advantages. These advantages include the additional shielding from electromagnetic radiation as a result of the bearing which is located outside the rotor bell-like member. Radiation emitted by the electric motor is thus shielded in an improved manner and the electromagnetic compatibility of the compressor arrangement is increased in a positive manner.

Furthermore, it may advantageously be possible, as a result of the support on the outer circumference of the outer rotor, for the magnetic flux in the stator to be improved because, in comparison with other known active principles, no opening in the stator is required to introduce the motor shaft.

Furthermore, as a result of the smaller extent of the rotor bell-like member in an axial direction, as a result of the omitted bearing at the ends of the rotor bell-like member, the active diameter of the rotor bell-like member is influenced to a lesser extent as a result of external forces, in particular connecting rod forces. Therefore, the air gap of the motor can be advantageously reduced as a result of a constructional configuration.

The outer rotor can have a flywheel mass weight. In specific terms, this means that there are arranged on the circumference of the external rotor or rotor, in addition to the inherent mass of the outer rotor, in particular the rotor bell-like member, mass-encumbered elements, in particular arranged uniformly over the circumference, or as an integral mass-encumbered element which extends uniformly over the circumference. This results in the advantage that energy which has been produced by the drive or electric motor by the rotating movement can be stored in the form of kinetic energy. As a result of the moment of inertia of the outer rotor which is increased in this manner, in particular brushless direct-current motors can comply in an improved manner with the dynamic requirements which exist in the automotive sector during compressed air production.

There is advantageously provision for the outer rotor to have a practically cylindrical eccentric journal which is arranged about an eccentric axis E, wherein the eccentric axis E is arranged parallel, but with a lifting spacing H relative to the center axis M, in particular the eccentric journal is formed in the form of a formation on a rotor end portion for receiving a connecting rod via a connecting rod bearing. In specific terms, this means that the eccentric journal which is used to rotatably connect the outer rotor to the connecting rod is arranged directly on the outer rotor, in particular on the rotor end portion. In this manner, as a result of this development an even more compact structural form of the compressor arrangement is achieved, particularly because a transmission of the drive energy from the motor to the connecting rod is carried out without any crank pins, or the like, arranged additionally on a drive shaft.

In the context of a preferred development, there is provision for the drive housing to have a drive housing body and a drive housing cover, wherein the stator is retained on the drive housing cover and the outer rotor is supported at an inner side of a housing wall of the drive housing body. In specific terms, this may mean in particular that the stator is arranged on the drive housing cover and consequently the assembly of the electric motor is carried out practically by the insertion of the drive housing cover in the drive housing. As a result of this development, in an advantageous manner an additional contribution to the compactness is achieved since it is possible to dispense with additional, housing-side fixing elements. Furthermore, the accessibility to the drive and consequently the maintenance-friendliness are improved because the stator is already disassembled by the removal of the cover. It is also possible to achieve a desired pretensioning of the bearing by a defined, predetermined spacing of the stator from the outer rotor in an axial direction, which pretensioning is produced by the magnetic forces which act between the stator and the outer rotor of the electric motor. By selecting this spacing in accordance with operating requirements, a positive, negative or neutral pretensioning can be achieved.

There is advantageously provision for the drive housing body to integrally form a motor housing and a crankcase of the compressor. In specific terms, this means that the drive and crank mechanism are located in a common space which is surrounded by the drive housing. This is particularly enabled by the bearing of the outer rotor on the outer circumference and the associated, omitted bearing of a motor shaft which would require an intermediate wall for receiving a crank-mechanism-side motor shaft bearing. As a result of this development, the compactness of the compressor arrangement is advantageously further increased.

There is in particular provision for the drive housing cover to be positioned on a front opening of the drive housing body in a closing manner at the front side. In specific terms, this means that the drive housing cover, similarly to a pot-cover connection, can be placed and fixed in a suitable manner on a face of the drive housing body for assembly. In particular, the drive housing cover and the drive housing body can be constructed by mutually conformed fitting faces in an axial and radial direction in a self-centering manner in order to form a common stator and rotor axis. This means that, during the assembly of the drive housing cover as a result of the contact of the corresponding fitting faces relative to each other, the drive housing cover is orientated relative to the drive housing body and consequently in particular the stator is orientated relative to the outer rotor. As a result of such a development, the assembly and maintenance-friendliness of the drive of the compressor arrangement can advantageously be improved because the orientation of the stator relative to the outer rotor no longer has to be provided by corresponding fixing elements or adjustment steps during the assembly.

In the context of a preferred development, there is provision for the stator to be arranged in such a manner that the axis of symmetry of the stator is orientated coaxially with the center axis, in particular the axis of symmetry of the stator is located on the center axis.

This may particularly specifically involve the fact that, as a result of the bearing of the outer rotor on the external circumference of the rotor bell-like member, a drive shaft as used in conventional compressor drives can be dispensed with. There is provision for construction of the outer rotor as a self-carrying unit, that is to say, a unit which transmits drive forces or torques directly and without any drive shaft. Thus, it is advantageously possible for the region of the stator surrounding the center axis to be constructed in a materially filling manner, in particular without any opening for a rotor shaft. Thus, the region around the rotation axis of the outer rotor which would normally be provided for an opening for introducing a motor shaft can be constructed in a materially filling manner. Thus, the magnetic flux in the stator is advantageously improved. Furthermore, it is nevertheless possible for the plate assembly of the stator to be at least partially constructed in a non-materially filling manner and therefore at least partially in a hollow manner. This may be advantageous, for example, in order to achieve weight savings. In particular, it is possible to avoid guiding a shaft through the region inside the region surrounded by the windings. There are thereby afforded advantages with regard to the magnetic flux which can then be guided in a shaft with smaller losses and without rotational fields.

There is advantageously provision for the bearing arrangement to have a bearing without an inner ring or a bearing without an outer ring. A bearing without an inner ring means that the bearing does not have any inner ring. In particular, the outer rotor of the electric motor, in particular the rotor bell-like member, performs the function of the inner bearing ring, of at least one bearing of the bearing arrangement. This includes the fact that the outer rotor, without a bearing inner ring being positioned, is in direct contact with the roller bearings or, in the case of a sliding bearing, in direct contact with the bearing outer ring. Similarly, a bearing without an outer ring means that the bearing does not have an outer ring. In particular, portions of the inner side of the housing wall which form a running face for the roller members perform the function of the bearing outer ring of at least one bearing of the bearing arrangement.

In particular in both developments, the surfaces which perform the function of the respective bearing rings can be produced in such a manner that they have, for example, as a result of suitable processing, surface and shape properties which qualify the outer rotor for use as a bearing inner ring or bearing outer ring. Such processing may particularly have pretreatment steps in order to adjust, in particular to increase, hardness and strength parameters of the surface which is in contact with the roller members, in particular the outer surface of the rotor bell-like member or the inner side of the housing wall, in particular in order to bring about operation of the drive with little noise and wear.

There is in particular provision for the electric motor to be formed as an electronically commutated, brushless direct-current motor having a control circuit comprising an electronic power unit. In specific terms, this means that the electric motor can be constructed according to these two structural forms, in accordance with constructive requirements. These requirements include in particular the price, dynamic properties during operation, such as acceleration, torque, speed and furthermore electromagnetic compatibility, service-life and freedom from maintenance.

In the context of a preferred development, there is provision for the bearing to be selected from a group of bearings comprising: sliding bearings, needle bearings, ball bearings, spherical roller bearings and cylindrical roller bearings. In specific terms, this means that a bearing type is selected in accordance with the constructive requirements. Needle and cylindrical roller bearings and generally roller bearings with cylindrical roller members have, as a result of the linear contact with the running face, a generally high radial load-bearing capacity. In the case of a needle bearing, in addition it is relatively compact as a result of the small roller member diameter and consequently in an advantageous manner it further reduces the installation space of the drive. As a result of the osculation in the roller contacts, ball bearings have a relatively high axial and radial load-bearing capacity. Spherical roller bearings further allow, as a result of the spherical configuration of the roller members and a hollow-sphere-like outer ring ball race, a specific oscillating movement between the inner ring and outer ring. Consequently, non-sensitivity with respect to oblique positioning and alignment errors of the rotor with respect to the stator are achieved.

There is advantageously provision for the bearing arrangement to have at least one single-rowed bearing or at least one multi-rowed bearing. This may involve in specific terms the outer rotor being formed by means of a two-rowed deep-groove ball bearing or two-rowed oblique ball bearing. A multi-rowed arrangement advantageously leads to an increase of the load-bearing capacity and allows, particularly with the oblique ball bearing, the adjustment of different pressure angles. Furthermore, as a result of the arrangement of the oblique bearing rows, freedom from play, support width, axial load-bearing capacity and axial force transmission can be influenced in order to comply with constructive requirements.

There is in particular provision for the outer rotor to be constructed in order to be fixed by the magnetic forces acting in the electric motor in an axial direction. This involves in specific terms no forces being transmitted via the bearing arrangement in an axial direction, such as, for example, in the case of a fixed/movable bearing or a support bearing, and the outer rotor being retained centrally relative to the stator in an axial direction simply by the magnetic forces acting between the outer rotor and stator. This development leads to the advantage that the bearings are not mechanically tensioned in an axial direction and the collar or the piston ring in the compressor which was otherwise fixed by the bearings consequently cannot be tensioned in a radial direction any more. The radial centering of the collar or the piston ring in the cylinder and the axial centering of the rotor relative to the stator complement each other in the ideal case at a low force level. In this manner, wear and electrical current during operation of the motor are advantageously reduced. Furthermore, forces which act in the crank mechanism act on the deformation of the rotor to a lesser extent as a result of the axial movability which can be achieved according to this development; consequently, a shaft flexion, as may occur in a conventional bearing of a compressor drive, is substantially prevented. By preventing flexion of the rotor or the shaft, in particular a smaller air gap of the electric motor and consequently correspondingly high forces and in particular a high torque of the electric motor are enabled. As a result of such a development, the structure-borne noise transmission from the outer rotor to the stator and therefore to the drive housing is also reduced, which has an advantageous effect on vibrations and noise development. This particularly applies to the reduction of structure-borne noise which would be produced as a result of axial movements of the motor armature during conventional rigid guiding of the rotor including the crankshaft and connecting rod. Furthermore, the risk of damage to the bearing or bearing fixing is reduced by axial forces from the crank mechanism which act in an axial direction and which in particular pulse in an abrupt manner, not being transmitted directly into the bearing and therefore into the entire unit.

In the context of a preferred development, there is provision for the outer rotor to be fixed via a bearing in an axial direction. This may involve in specific terms the fact that the bearing for supporting the rotor on the outer circumference is constructed to receive axial forces. Alternatively or additionally, this may mean that the fixing is carried out in an axial direction via a second bearing which is arranged with an axial spacing from the first bearing. This bearing can be constructed as a radial bearing which receives axial forces or as an exclusively axial bearing. This development leads to the advantage that the outer rotor is fixed in an axial direction, in particular without fixing by a connecting rod or magnetic forces of the electric motor being necessary.

There is advantageously provision for at least one weight, in particular a flywheel mass weight and/or a compensating weight for compensating for imbalance, to be arranged on the circumference of the rotor, in particular on the circumference of the rotor bell-like member. This involves in specific terms there being arranged on the outer rotor at least one weight which is positioned in accordance with the actual mass distribution of the rotor in such a manner on the outer rotor that the total of the forces which act on the rotating outer rotor as a result of the rotation is minimized. This particularly relates to forces which are directed into the outer rotor as a result of the eccentric journal and components fixed thereto. In this manner, a low-vibration and low-noise operation of the drive and consequently of the compressor is advantageously achieved. In particular, a complete rotational mass compensation is achieved.

There is in particular provision for the outer rotor to be rotatably supported on the drive housing by means of two bearings which are arranged with spacing in an axial direction. In specific terms, this means that the outer rotor is supported in the drive housing by means of two bearings which are arranged in particular at sides of the rotor bell-like member which are opposite in an axial direction. In this manner, it is advantageously possible to increase the load-bearing capacity of the bearings. Furthermore, the support width of the bearing can be increased by the two-fold bearing arrangement, in particular for receiving bending moments in an improved manner. This further particularly relates to the use of two single-rowed oblique ball bearings which are arranged in accordance with this development.

In the context of a preferred development, there is provision for the stator to be arranged in an axial direction so as to be adjustable on the drive housing cover. This adjustability can be achieved in constructive terms, for example, by an adjustment thread in the stator or a drive housing cover which is adjustable in an axial direction. In order to achieve this feature, that is to say, adjustability of the drive housing cover in an axial direction, slots can be provided in the drive housing body in an axial direction. As a result of such slots, the drive housing cover can be fixed, for example, by means of screws after adjustment of the desired axial position. Furthermore, the drive housing body can be constructed in such a manner that it has at least one groove which extends helically on a cylindrical inner surface of the opening for the drive housing cover. As a result of corresponding journals which widen radially at the side of the drive housing cover, it can be adjusted in an axial direction by rotating and guiding the journals of the drive housing cover in the grooves of the drive housing body. After the axial position which is intended to be adjusted is reached, the cover can be fixed via screws or similar fixing means and secured to prevent rotation.

As a result of adjustability of the stator in an axial direction, an adaptability of the axial pretensioning of the rotor and in particular of the rotor bell-like member in the assembled state is advantageously achieved. In this manner, a desired operating behavior can be achieved in accordance with the pretensioning, in particular by adjusting a positive, negative or neutral pretensioning.

Embodiments of the invention will now be described below with reference to the drawings. These drawings are not necessarily intended to depict the embodiments in a manner true to scale, but instead the drawings are carried out in a schematic and/or slightly distorted form where advantageous for explanation. With regard to supplements to the aspects of teaching which can be directly recognized from the drawings, reference may be made to the relevant prior art. In this case, it should be taken into account that various modifications and changes in relation to the form and detail of an embodiment can be carried out without departing from the general notion of the invention. The features which are disclosed in the description, drawings and claims may be significant both individually and in any combination. Furthermore, all combinations comprising at least two of the features disclosed in the description, drawings and/or claims are included within the scope of the invention. The general notion of the invention is not limited to the precise form or the detail of the preferred embodiments which are shown and described below or limited to subject-matter which would be limited in comparison with the subject-matter claimed in the claims. In the case of measurement ranges set out, values which also lie within the mentioned limits are intended to be disclosed as limit values and are intended to be able to be freely used and claimed. For the sake of simplicity, the same reference numerals are used below for identical or similar components or components with an identical or similar function.

FIG. 1 shows a constructive configuration of a compressed air supply installation 1000 in the context of a first variant of a particularly preferred embodiment. The compressed air supply installation 1000 has a housing 120 which in turn has a dryer and valve housing 122, a compressor housing 124 and a drive housing 126.

In the constructive illustration of the compressed air supply installation 1000 of FIG. 1, the housing 120 thereof can be seen with a drive housing 126 for carrying out the compressor arrangement 100 comprising the compressor 400 and the drive, wherein the drive in the form of an electric motor 300 and the crank mechanism 350 are received in the drive housing 126. The drive housing can equally well be configured as a motor housing or a similar housing.

The housing arrangement 120 further comprises a compressor housing 124 for the compressor 400. A dryer and valve housing 122 adjoins the compressor housing 124 and comprises the dryer housing and electric and/or electronic and pneumatic interfaces together with a mechatronic system and an arrangement of valves—substantially to illustrate the valve arrangement 142.

A piston 402 which can be moved back and forth and which has a collar or a piston ring 406 is retained on a connecting rod 404 of a crank mechanism 350 in the compressor housing 124. The connecting rod 404 which is itself configured as a piston rod is supported on an eccentric journal 342.

The drive formed with the electric motor 300 for the crank mechanism 350 and the crank mechanism 350 are substantially received in the drive housing 126. The drive itself has a stator 304 with a stator winding 306 in order to form the electric motor 300. Furthermore, the drive has a rotor or outer rotor 340 having a rotor bell-like member 348 and an arrangement of permanent magnets 308 fitted thereto.

In order to construct the motor 300 in the form of an external rotor motor for the drive, the outer rotor 340 is retained separately by an air gap 312 around the stator 304. The stator 304 is consequently surrounded by the outer rotor 340 in a rotatable manner about a center axis M which coincides with the axis of symmetry S of the stator 304 by the stator 304 being arranged accordingly. In this instance, the outer rotor 340 is rotatably retained on a bearing arrangement 320 in the drive housing 126, that is to say, in an inner side 132 of a housing wall 129 of the drive housing 126, while the stator 304 is formed as part of a drive housing cover 130. The drive housing 126 can be closed by means of the drive housing cover 130 by inserting the drive housing cover 130 into a front opening 134 of the drive housing body 128. Alternatively, the stator 304 can also be releasably fixed on the drive housing cover 130 via suitable fixing means, in particular screws. It is also possible, not illustrated here, for the outer rotor 340 to be fixed via the magnetic forces MK which act in the electric motor 300 and which are schematically indicated here in an axial direction A. Furthermore, it is possible according to a development to adjust the stator 304 relative to the outer rotor 340 in an axial direction A. This can be achieved, for example, via an adjustment means, for example, one or more threads or one or more fitting faces which allow an axial displaceability of the drive housing cover 130 relative to the drive housing body 128. Additionally or alternatively, adjustment screws can also be used to adjust and fix the drive housing cover or the stator.

The outer rotor 340 does not have any central rotor shaft in the conventional sense but instead forms with the rotor bell-like member 348 a self-supporting, in particular integral, unit, on which the eccentric journal 342 which is particularly formed by an integral formation 341 is also fixed.

The outer rotor 340 and the eccentric journal 342 and the connecting rod 404 form the significant force-transmitting elements of the crank mechanism 350 which is driven by the electric motor 300, wherein the connecting rod 404 is connected to the eccentric journal 342 in a rotationally movable manner by means of a connecting rod bearing 344. The connecting rod bearing 344 is constructed to carry out a rotating movement of the rotor 340 and, in an additional configuration, also a back and forth movement of the connecting rod 404. As a result of a rotating movement of the rotor 340, consequently, the connecting rod 404 and accordingly the piston 402 is caused to carry out a mainly translational lifting movement for driving the compressor. Furthermore, the outer rotor may have a compensation weight for compensating for the imbalance brought about by the eccentric journal 342 and components fixed thereto, which is not illustrated in greater detail here.

FIGS. 2A to 2F illustrate as a cross-sectional cutout by way of example different embodiments of the bearing 320 of the rotor 340. The cutout shows a cross-section through the bearing ring at the transition between the rotor bell-like member 348 and the drive housing body 128.

FIG. 2A schematically shows a cutout of the rotor bearing. In this development shown, a bearing arrangement 320*a* has a bearing 313*a* in the form of a sliding bearing 314 which allows a rotating relative movement between the rotor bell-like member 348 of the outer rotor 340 and the drive housing body 128. The advantage of a sliding bearing involves the small constructive complexity by means of which the bearing can be produced. In particular, it is possible in the case of a sliding bearing to dispense with rotating roller members. In the form of the sliding bearing illustrated, an axial movability of the rotor is provided and is limited only by other forces which act on the outer rotor 340, for example, of the stator 304 or the connecting rod 404. The sliding bearing can further be produced using different construction methods, for example, by a sliding sleeve which is formed from a low-friction material or in the form of a hydrodynamic sliding bearing. For the last case, however, constructive measures for shielding and storing a lubricant would again have to be carried out and increase the construction complexity.

FIG. 2B further shows a cutout I of an additional embodiment of the rotor bearing. In this development, a bearing arrangement 320*b* has a bearing 313*b* without an inner ring in the form of a needle bearing 315 without an inner ring, that is to say that the needle bearing 315 without an inner ring does not have any bearing inner ring but instead the roller members 322*b* are in direct contact with the outer surface of the rotor bell-like member 348. An outer ring 324*b* of the needle bearing 315 further has at the left side and the right side thereof an edge B, which limits the movement of the roller members 322*b* in an axial direction. Furthermore, the surface of the rotor bell-like member 348 is constructed in such a manner that it can be moved in an axial direction relative to the roller members 322*b* and therefore the needle bearing 315 without an inner ring is formed as a movable bearing. In a manner similar to the embodiment shown in FIG. 2A, this results in an axial movability of the rotor 340 which is limited only by the already-described additional forces which act on the outer rotor 340. The embodiment shown in FIG. 2B has a particularly advantageous effect on the necessary structural space as a result of the compact construction type, particularly as a result of the small roller member diameter and the omitted bearing inner ring.

Nevertheless, it is possible in an alternative embodiment of a bearing arrangement 320*b*' which is shown in an additional view II to provide, with a bearing 313*b*' which does not have an outer ring, an arrangement which is transposed in a radial direction of the bearing elements described here. In this case, roller members 322*b*' are in direct contact with the inner side 132 of the drive housing body 128. A bearing inner ring 326*b*' has, similarly to the above-described outer ring 324*b*, at the left side and right side thereof an edge B', which limits the movement of the roller members 322*b*' in an axial direction. Consequently, the above-described advantages are similarly achieved, with particular regard to the structural space.

In both cases, it is possible and even advantageous to accordingly process the surface which as a running face is in direct contact with the roller members 322*b*, 322*b*', that is to say, the inner side 132 of the drive housing body 128 or the outer surface of the rotor bell-like member 348, in order to improve the tribological properties. In particular, a hardening or coating of the surface is conceivable here.

Figure 2C:
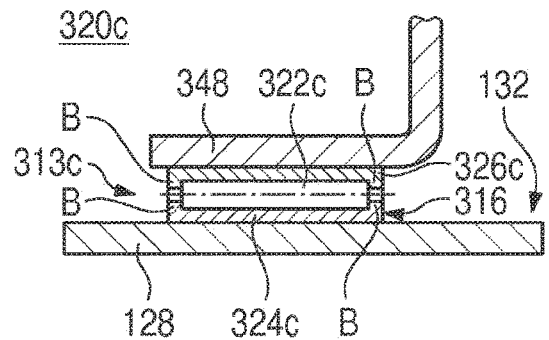

FIG. 2C shows a cutout of an additional preferred development of a rotor bearing. In this development, the rotor bell-like member 348 is rotatably supported in the drive housing body 128 via a bearing arrangement 320*c* which is constructed with a bearing 313*c* in the form of a needle bearing 316 with an inner ring. In this embodiment, the bearing 316 has both a bearing outer ring 324*c* and a bearing inner ring 326*c*. Furthermore, both the bearing outer ring 324*c* and the bearing inner ring 326*c* have at the left side and right side edges B which limit the movement freedom of the rolling members 322*c* in an axial direction and thus allow the transmission of axial forces by the bearing arrangement 320*c*. In this embodiment, consequently, the outer rotor 340 or the rotor bell-like member 348 is retained via the bearing arrangement 320*c* axially in the drive housing body 128. In this manner, forces which act in an axial direction and which, for example, are directed via the connecting rod into the outer rotor 340 can be taken up by the bearing arrangement 320*c* and directed into the drive housing body 128 independently of the magnetic forces which act as a result of the electric motor 300.

Figure 2D:
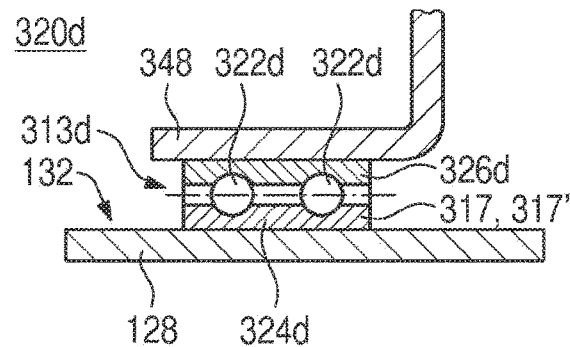

FIG. 2D shows an additional preferred embodiment of the rotor bearing. In this development, a bearing arrangement 320*d* has a bearing 313*d* in the form of a multi-rowed rolling bearing 317 having a bearing outer ring 324*d* and a bearing inner ring 326*d* which is formed in this instance as a two-rowed deep-groove ball bearing 317'. As a result of the doubled number of roller members 322*d* in comparison with a one-rowed configuration, a corresponding increase of the load-bearing capacity of the bearing is produced. The two-rowed construction type also has a positive effect on the prevention of tilting of the rotor as a result of torques, in particular bending torques, which are introduced via connecting rod forces which act on the outer rotor 340. It is further possible, instead of the two-rowed deep-groove ball bearing 317', to use a one-rowed ball bearing 317", in particular a deep-groove ball bearing, which has only one row of roller members 322*d* and which is not illustrated here.

Figure 2E:
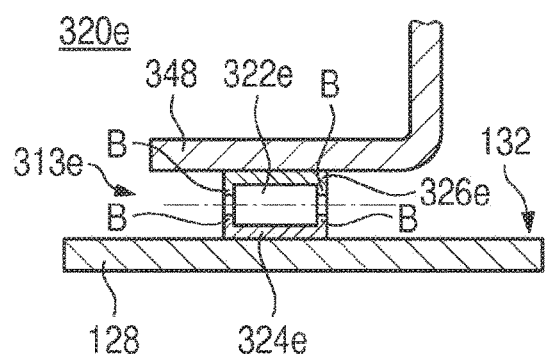

FIG. 2E shows an additional preferred embodiment of the rotor bearing. In this development, a bearing arrangement 320*e* has a bearing 313*e* in the form of a cylindrical roller bearing 318. Unlike a needle bearing 315, 316, the roller members 322*e* of a cylindrical roller bearing 318 have a larger diameter. In spite of the higher structural space requirements, this embodiment is advantageous with regard to speeds of the rotor 340 which can be reached. Furthermore, in this embodiment both the bearing outer ring 324*e* and the bearing inner ring 326*e* also have edges B, which limit the axial freedom of movement of the roller members 322*e*. Similarly to the embodiments shown in FIGS. 2C and 2D, the outer rotor 340 is fixed by the bearing arrangement 320*e* in the embodiment shown in FIG. 2E. It is also possible to use, instead of a cylindrical roller bearing 318, a spherical roller bearing 319 which has sphere-like roller members in place of cylindrical roller members and which is not illustrated here.

Figure 2F:
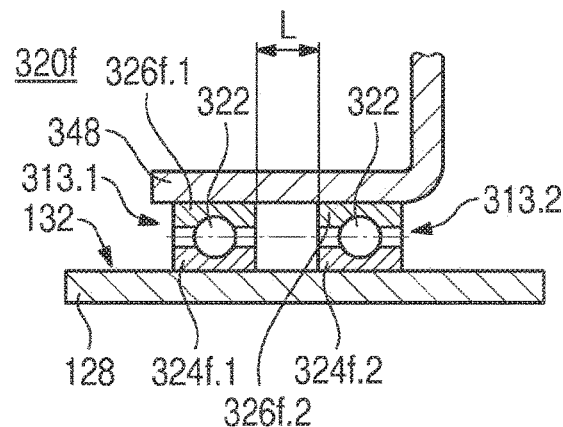

FIG. 2F shows an additional particularly preferred embodiment of the rotor bearing. In this embodiment, a bearing arrangement 320*f* has two separate roller bearings 313, which are constructed in this instance as deep-groove ball bearings 317, that is to say, a bearing 313.1 remote from the connecting rod and a bearing 313.2 near the connecting rod. The bearing 313.1 remote from the connecting rod has a bearing outer ring 324*f*.1 and a bearing inner ring 326*f*.1. The bearing 313.2 near the connecting rod has a bearing outer ring 324*f*.2 and a bearing inner ring 326*f*.1. In this embodiment, the advantage already afforded in the development illustrated in FIG. 2D involving an increased load-bearing capacity of the bearing is also achieved in particular in a further improved manner. The bearings 313.1, 313.2 are constructed in this development as a one-rowed deep-groove ball bearing 317. By selecting a larger bearing spacing L which describes the axial spacing of both bearings 313.1, 313.2, the capacity of the bearing to receive torques can be further improved. Such torques can be directed into the outer rotor 340 in particular in the form of connecting rod forces which act on the eccentric journal 342.

The bearing types which are illustrated in FIGS. 2B, 2C, 2D and 2E, in particular the bearing arrangements 320*b*, 320*c*, 320*d*, 320*e*, can be fixed in an axial direction in the drive housing in a positive-locking manner. This can be achieved in particular by a step on the fitting face which acts as a bearing seat in the drive housing body 128, against which step the bearing outer ring 324, 324*b*, 324*c*, 324*d*, 324*e* is pressed during assembly of the drive housing cover 130 by a suitable annular step in the drive housing cover 130.

The bearings 313*b-e*, 313.1, 313.2 illustrated in FIGS. 2B, 2C, 2D, 2E and 2F in the bearing arrangements 320*b*, 320*c*, 320*d*, 320*e*, 320*f* are all special construction forms of one or more roller bearings. The individual bearing types can be varied depending on requirements and applications. Thus, for example, in place of the arrangement shown in FIG. 2F of two deep-groove ball bearings, two needle bearings or cylindrical roller bearings can also be used.

In an embodiment shown in FIG. 2F with a plurality of bearings being arranged, a spacer sleeve for fixing in an axial direction can further be used between the bearing outer rings of the individual bearings. Alternatively, in this embodiment steps with different diameters can also be used both at the side of the rotor 340 and at the side of the drive housing body 128 in order to fix the respective bearing outer rings 324*f*.1, 324*f*.2 and bearing inner rings 326*f*.1, 326*f*.2 in a positive-locking manner in an axial direction. Furthermore, it is also possible to use bearings having different inner and outer diameters in order to be fixed in a positive-locking manner in an axial direction at different cylindrical steps with similarly different diameters. Finally, it is also possible to achieve the axial fixing of the bearing arrangements 320, 320*a-f* by the outer surface of the rotor bell-like member 348 and/or the inner surface of the drive housing body 128 being configured conically.

Figure 3A:
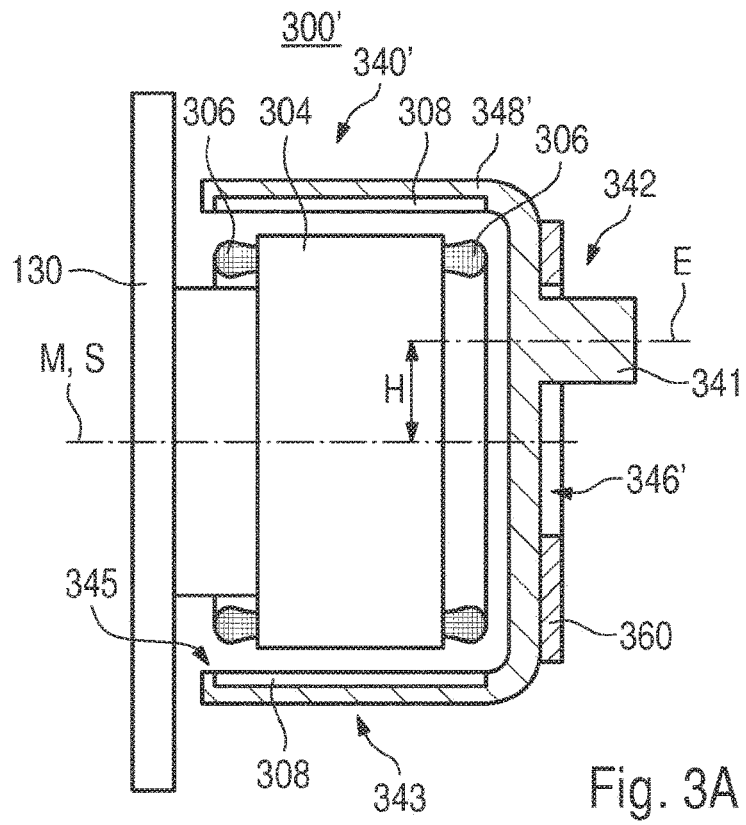
FIGS. 3A-B are detailed views of an electric motor.

FIG. 3A is a schematic view of an electric motor 300' in another preferred development. In this view, the stator 304 is arranged on the drive housing cover 130. The rotor bell-like member 348' of the outer rotor 340' is constructed and arranged in such a manner that it radially surrounds the stator 304 and is supported rotatably about the center axis M. An illustration of details, in particular of the bearings, has been omitted for reasons of clarity and simplification. The outer rotor 340' further has on the rotor end portion 346' an eccentric journal 342 in the form of an integral formation 341, the eccentric axis E of which is arranged with radial lifting spacing H from the center axis M.

Furthermore, a flywheel mass weight 360 which is constructed in this development as an annular mass-encumbered member which in this instance constitutes practically an extension of the rotor bell-like member in an axial direction is arranged on the rotor end portion 346'. Nevertheless, naturally other construction types and arrangements of a flywheel mass weight 360 are possible, for example, on the outer circumference 343 of the rotor bell-like member 348' or on the inner circumference 345, with an adequate axial spacing from the stator winding 306, permanent magnet arrangement 308 and a bearing arrangement 320, 320*a-f* which is not illustrated here, and generally as the structural space of the development allows. It is generally the case that an arrangement of the flywheel mass weight 360 further outward on the diameter of the rotor increases the moment of inertia of the outer rotor 340. In this instance, it can be seen that the radial extent of the flywheel mass weight 360 above the eccentric journal 342 is greater than under the eccentric journal 342. As a result of a variable configuration of the flywheel mass weight 360 which differs from an annular shape in a radial direction, a mass compensation can further advantageously be achieved in order to minimize or eliminate imbalances occurring during operation.

Figure 3B:
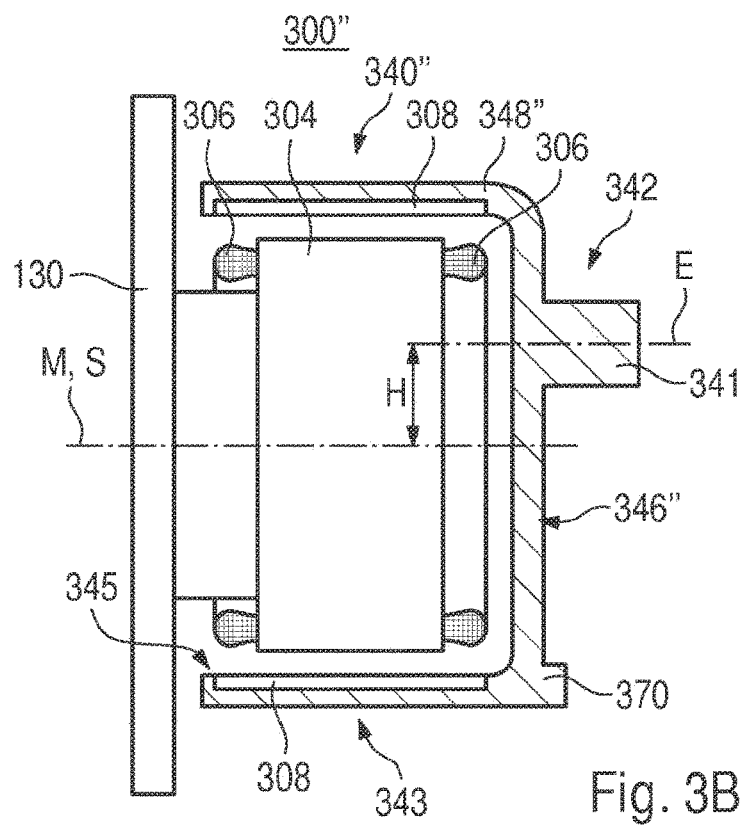

The development of an electric motor 300" shown in FIG. 3B differs from the development shown in FIG. 3A in that it does not have any flywheel mass weight 360 but instead on the rotor end portion 346" a compensation weight 370 which is arranged in particular opposite the eccentric journal 342 in a radial direction in order to achieve a rotational mass compensation. It is thereby particularly intended to be possible for the mass and inertia forces of the eccentric journal 342 and the components which are connected to the eccentric journal 342, in particular the connecting rod 404, which is not illustrated here, and piston 402 to be compensated for by the accelerated compensation weight 370. Thus, it may be possible in a constructive manner for occurring imbalances to be able to be minimized and in particular practically completely eliminated. In this case, the compensation weight is fitted as close as possible to the outer circumference 343 of the rotor bell-like member 348" of the outer rotor 340" because it can thus advantageously be smaller in order to produce a force which compensates for the imbalances, in particular in comparison with an arrangement nearer the axis of symmetry S of the stator or rotor.

Figure 4:
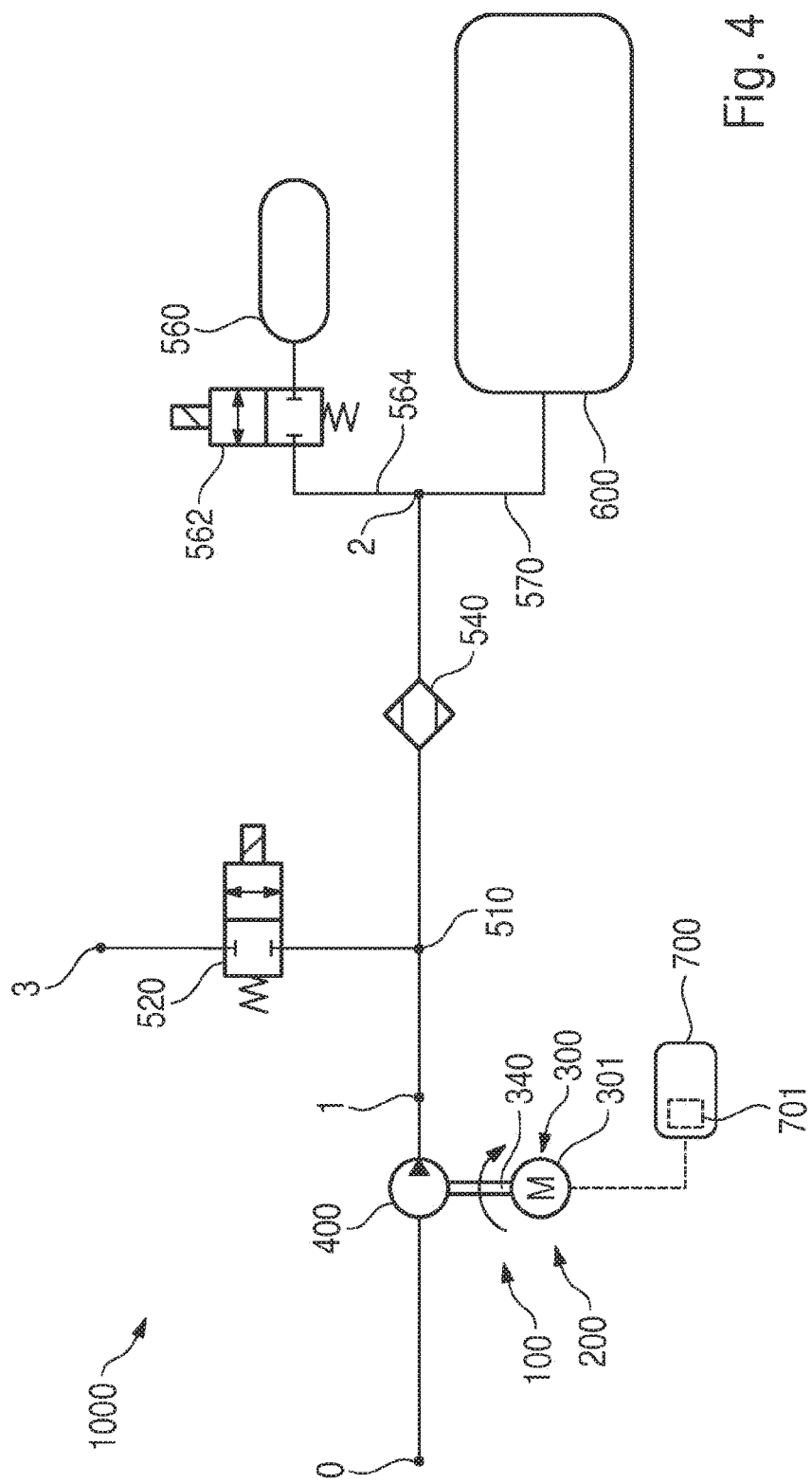
FIG. 4 is a highly simplified schematic overview of a compressed air supply installation.

FIG. 4 is a highly simplified, schematic overview of a compressed air supply installation 1000 with a compressor arrangement 100 for supplying a pneumatic installation 600. The compressed air supply installation 1000 has an air intake 0 for drawing fresh air which is further connected to an inlet of the compressor 400 in a fluid-conveying, in particular gas-conveying manner. The compressor 400 is driven as part of the compressor arrangement 100 by a drive 200 having an electric motor 300 which is constructed in this case as a brushless direct-current motor 301 and which is controlled by a control circuit 700 with an electronic power unit 701, via an outer rotor 340. The compressed fresh air is further provided via a compressed air source 1, to which a branch 510 is connected. A ventilation 3 is connected to this branch 510, on the one hand, via a ventilation valve 520. On the other hand, an air dryer 540 which further leads to a compressed air connection 2 is connected to the branch 510. A compressed air store 560 is connected thereto via a storage line 564 and a storage valve 562 and furthermore the pneumatic installation 600 is connected thereto via a screen 570. The pneumatic installation 600 may be, for example, a pneumatic spring installation or an additional pneumatic installation, in particular of a vehicle. Furthermore, individual valves, throttles and similar adjustment means and individual components, in particular of the pneumatic installation, are not illustrated in this illustration for reasons of clarity and simplification.

Figure 5:
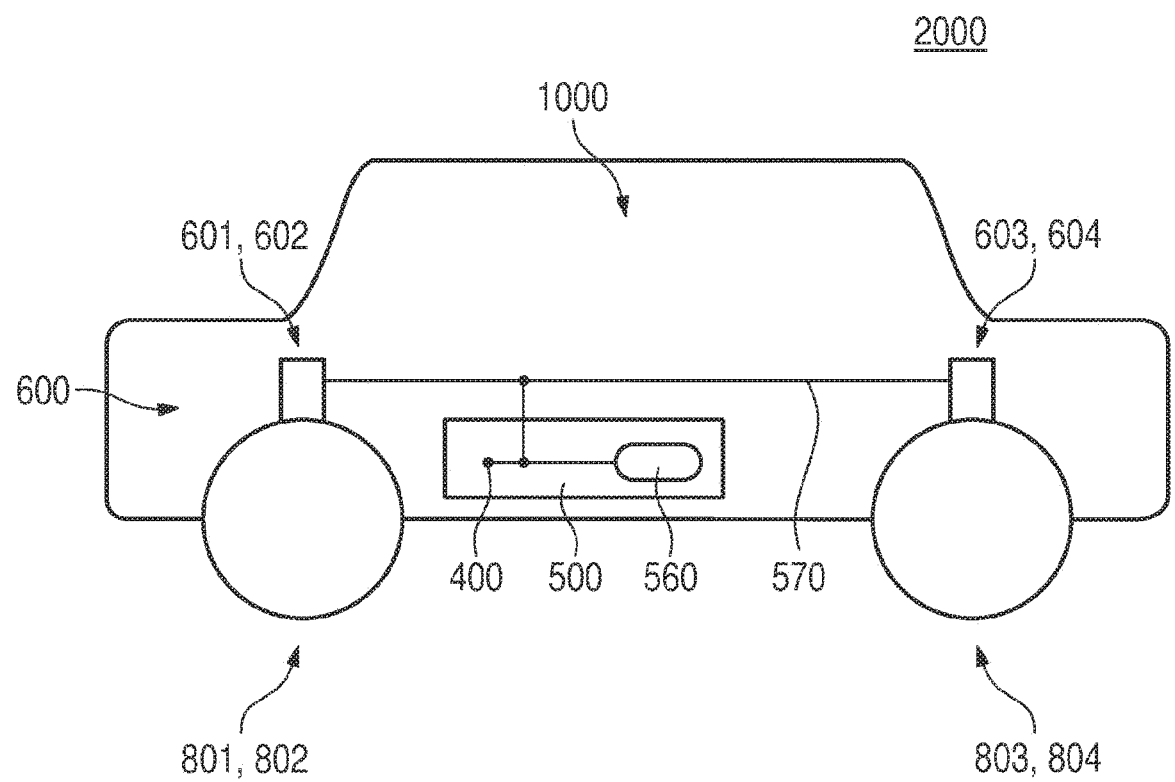
FIG. 5 is a schematic illustration of a vehicle having a compressed air supply installation.

FIG. 5 is a schematic illustration of a vehicle 2000—in this case, in the form of a passenger vehicle—having a compressed air supply installation 1000 and a pneumatic installation 600. In vehicles in the passenger vehicle sector, low-noise and low-vibration operation is highly significant because here, unlike applications in the commercial vehicle sector, the acoustic requirements are higher or more sensitive. The passenger vehicle 2000 which is illustrated here by way of example for this reason, without limiting the applicability to trucks or other utility vehicles, has four wheels 801, 802, 803 and 804, of which the two front wheels are shown here as a result of the cross-sectional illustration. Similarly to the number of wheels, the pneumatic installation 600 has four pneumatic springs 601, 602, 603 and 604, of which the two front pneumatic springs are shown here as a result of the cross-sectional illustration similarly to the wheels. The pneumatic springs 601, 602, 603 and 604 which are each associated with the wheels 801, 802, 803 and 804 are supplied with compressed air as part of the pneumatic installation 600 by the compressed air supply installation 1000. The compressed air supply installation 1000 is connected in a fluid-conveying manner via the screen 570 to the components of the pneumatic installation 600, in this case the pneumatic springs 601, 602, 603 and 604 illustrated here.

The compressed air supply installation 1000 is shown in this illustration in a highly simplified manner so that only the compressed air store 560 and the compressor 400 can be seen.

However, the compressor 400 could be used additionally or alternatively independently of the compressed air supply installation in a modification which is not shown here.

The concept preferably provides the basis for a compressor arrangement which functions in an improved manner, in particular one which is compact and low in noise and vibrations. Furthermore, a reduction of forces and/or moments and in particular a reduction of the dynamic loads and vibrations which are connected with the forces and/or moments lead to a more protective operation which has a positive effect on the efficiency and service-life of the compressor arrangement.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

0 Air intake
1 Compressed air source
2 Compressed air connection
3 Ventilation
100 Compressor arrangement
120 Housing
122 Dryer and valve housing
124 Compressor housing
126 Drive housing
128 Drive housing body
129 Housing wall
130 Drive housing cover
132 Inner side of the housing wall
134 Front opening of the drive housing body
140 Air dryer
142 Valve arrangement
200 Drive
220 Crankcase
222 Motor housing
300, 300', 300" Electric motor
301 Brushless direct-current motor
304 Stator
306 Stator winding
308 Permanent magnet arrangement 312 Air gap
313, 313a-e, 313.1, 313.2 Bearing
314 Sliding bearing
315 Needle bearing without inner ring
316 Needle bearing, needle bearing with inner ring
317 Multi-rowed bearing
317' Two-rowed deep-groove ball bearing
318 Cylindrical roller bearing
320, 320a-f Bearing arrangement
322, 322b-f Roller members
324, 324b-e, 324f.1, 324f.2 Bearing outer ring
326, 326b', 326c-e, 326f.1, 326f.2 Bearing inner ring
330 Bearing remote from connecting rod
332 Bearing near connecting rod
340, 340', 340" Outer rotor
341 Formation, integral formation
342 Eccentric journal
343 Outer circumference of the outer rotor
344 Connecting rod bearing
345 Inner circumference of the outer rotor
346, 346', 346" Rotor end portion
348, 348', 348" Rotor bell-like member
350 Crank mechanism
360 Flywheel mass weight
370 Compensation weight
400 Compressor/Pressure application unit
402 Piston
404 Connecting rod
406 Collar, piston ring
510 Branch
520 Ventilation valve
540 Air dryer
560 Compressed air store
562 Storage valve
564 Storage line
600 Pneumatic installation
601, 602, 603, 604 Pneumatic spring
700 Control circuit
701 Electronic power unit
800 Vehicle
801, 802, 803, 804 Wheel
1000 Compressed air supply installation
2000 Vehicle
A Axial direction
B, B' Edge
E Eccentric axis
H Lifting spacing
L Bearing spacing
M Center axis, axial direction
MK Magnetic force
S Axis of symmetry of the stator

The invention claimed is:

1. A compressor arrangement for operating a compressed air supply installation, the compressor arrangement comprising:
   an electric motor arranged inside a drive housing, the electric motor having:
      an internal stator, and
      an external outer rotor, the external outer rotor being arranged in a rotatable manner about the internal stator;
   a pneumatic compressor; and
   a bearing arrangement configured to support the external outer rotor, in a rotatable manner about a center axis of the external outer rotor, with respect to the drive housing,
   wherein the bearing arrangement includes at least one bearing, and
   wherein the bearing arrangement supports the external outer rotor with respect to the drive housing on an outer circumference of the external outer rotor.

2. The compressor arrangement as claimed in claim 1, wherein the outer rotor has a flywheel mass weight.

3. The compressor arrangement as claimed in claim 1, wherein the outer rotor has a practically cylindrical eccentric journal which is arranged about an eccentric axis, wherein the eccentric axis is arranged parallel and with a lifting spacing relative to the center axis.

4. The compressor arrangement as claimed in claim 3, wherein the eccentric journal is a formation on a rotor end portion configured to receive a connecting rod via a connecting rod bearing.

5. The compressor arrangement as claimed in claim 1, wherein the drive housing has a drive housing body and a drive housing cover,
   wherein the stator is retained on the drive housing cover, and
   wherein the bearing arrangement supports the outer rotor on an inner side of a housing wall of the drive housing body.

6. The compressor arrangement as claimed in claim 5, wherein the drive housing body forms a motor housing and a crankcase of the compressor, wherein the drive housing cover is positioned on a front opening of the drive housing body in a closing manner at the front side.

7. The compressor arrangement as claimed in claim 1, wherein the stator is arranged such that an axis of symmetry of the stator is orientated coaxially with the center axis, wherein a region of the stator surrounding the center axis is constructed in a materially filling manner or is at least partially hollow and free from a rotor shaft.

8. The compressor arrangement as claimed in claim 1, wherein the at least one bearing comprises a bearing without an inner ring and/or a bearing without an outer ring.

9. The compressor arrangement as claimed in claim 1, wherein the electric motor is an electronically commutated, brushless, direct-current motor having a control circuit comprising an electronic power unit.

10. The compressor arrangement as claimed in claim 1, wherein the at least one bearing comprises a bearing selected from the group consisting of: a sliding bearing, a needle bearing, a ball bearing, a spherical roller bearing, and a cylindrical roller bearing.

11. The compressor arrangement as claimed in claim 1, wherein the bearing arrangement includes at least one single-rowed bearing or at least one multi-rowed bearing.

12. The compressor arrangement as claimed in claim 1, wherein the electric motor is configured to generate magnetic forces acting in an axial direction between the stator and the outer rotor to pretension the at least one bearing of the bearing arrangement.

13. The compressor arrangement as claimed in claim 1, wherein the outer rotor is fixed via a further bearing in an axial direction.

14. The compressor arrangement as claimed in claim 1, wherein at least one weight is arranged on the external circumference of the outer rotor.

15. The compressor arrangement as claimed in claim 4, wherein the outer rotor is rotatably supported on the drive housing via a second bearing remote from the connecting rod and a third bearing near the connecting rod, the second bearing and the third bearing being arranged with a spacing in an axial direction.

16. The compressor arrangement as claimed in claim 1, wherein the stator is arranged in an axial direction so as to be adjustable on the drive housing cover.

17. A compressed air supply installation, comprising:
a compressor arrangement as claimed in claim 1;
an air dryer; and
a valve arrangement.

18. A vehicle, comprising:
a pneumatic installation; and
a compressed air supply installation as claimed in claim 17,
wherein the compressed air supply installation as claimed in claim 17 is configured to operate the pneumatic installation.

19. The compressor arrangement as claimed in claim 1, wherein the at least one bearing of the bearing arrangement includes:
a radially inner surface contacting the external circumference of the external outer rotor, and
a radially outer surface contacting a radially inner surface of an inner side of a housing wall of the drive housing.

20. The compressor arrangement as claimed in claim 19, wherein the radially inner surface of the at least one bearing contacts the external circumference of the external outer rotor along an entire circumference of the radially inner surface of the at least one bearing, and
wherein the radially outer surface of the at least one bearing contacts the radially inner surface of the inner side of the housing wall of the drive housing along an entire circumference of the radially outer surface of the at least one bearing.

* * * * *